United States Patent [19]
Blinkilde

[11] 3,870,120
[45] Mar. 11, 1975

[54] VEHICLE GEAR SELECTOR CONTROL APPARATUS

[75] Inventor: Paul J. Blinkilde, Lathrup Village, Mich.

[73] Assignee: Epsex International, Inc., Fort Wayne, Ind.

[22] Filed: Feb. 11, 1974

[21] Appl. No.: 441,351

[52] U.S. Cl. ............ 180/82 C, 307/10 SB, 335/248, 180/82 A, 180/101
[51] Int. Cl. ............................................ B60r 21/10
[58] Field of Search........ 180/82 C, 101, 102, 82 A; 340/278, 53 E; 307/10 SB; 335/268; 70/248

[56] References Cited
UNITED STATES PATENTS

| | | | |
|---|---|---|---|
| 2,890,581 | 6/1959 | Lewis | 70/248 |
| 3,438,455 | 4/1969 | Redmond | 180/82 C |
| 3,449,714 | 6/1969 | Farley | 180/82 C X |
| 3,576,473 | 4/1971 | Genbauffe et al. | 335/268 |
| 3,737,850 | 6/1973 | Kopp | 180/82 C |

*Primary Examiner*—Kenneth H. Betts
*Attorney, Agent, or Firm*—Learman & McCulloch

[57] ABSTRACT

Apparatus for locking a vehicle's gear selector lever in a non-drive mode unless the vehicle driver's body-restraining belts are coupled comprises a solenoid having a first coil operable to drive a gear selector lever locking member to its lock position when the engine starting mechanism is energized and a second coil operable to maintain the locking member in the lever-locking position until the driver's body-restraining belts are fastened, whereupon the locking member is restored to its non-lock position to enable the gear selector lever to be adjusted to a drive mode.

11 Claims, 7 Drawing Figures ics gear selector lever is in a start position, and regardless of the condition of the passenger body restraint belts, but which will prevent movement of a motor vehicle's gear selector lever to a drive position following starting of the engine unless the driver and other front seat passengers fasten their body-restraining belts.

VEHICLE GEAR SELECTOR CONTROL APPARATUS

The invention disclosed herein relates to apparatus for enabling the engine of a vehicle to be started when its gear selector lever is in a start position, and regardless of the condition of the passenger body restraint belts, but which will prevent movement of a motor vehicle's gear selector lever to a drive position following starting of the engine unless the driver and other front seat passengers fasten their body-restraining belts.

Current motor vehicles are equipped with a seat belt/starter interlock system which prevents the vehicle engine from being started unless the driver's seat is occupied and the driver's and other front seat passengers' body-restraining belts are fastened. There are many instances, however, in which it is desirable to operate the vehicle's engine for purposes other than driving the vehicle. For example, it may be necessary for the engine to be operating so that it can be worked upon by a mechanic. Further, it frequently is desirable that the engine of a vehicle be operated without requiring the presence of the driver for a sufficient period of time to enable its heater to warm the passenger compartment. In such instances, the requirement that the driver's seat be occupied and that his seat and shoulder belts be buckled performs no useful purpose.

The seat belt/starter interlock system of current motor vehicles customarily includes an electronic control module which is coupled electrically to the vehicle's engine starting system, to selected vehicle seats, and to the restraining belt system so as to enable starting of the vehicle's engine only in response to fastening of the restraining belts associated with those seats that are occupied. The control module includes components which are quite small and have limited current carrying capabilities. In contrast, a vehicle's gear shifting mechanism is quite rugged. Consequently, any apparatus which is to be used to lock the gear shifting mechanism against movement must be sufficiently massive to be compatible with the shifting mechanism. The relatively delicate control module, however, is incapable of controlling, by itself, locking apparatus which is sufficiently massive to prevent operation of the shifting mechanism.

In most vehicles the gear selector lever is mounted on the steering column assembly within a tubular shroud. Space within the shroud is extremely limited. However, apparatus for effecting locking of the gear shifting mechanism preferably should be locked within the shroud so as to avoid the expense and looseness of linkage mechanisms and so as to minimize the possibility of tampering with the locking apparatus.

An object of this invention is to provide apparatus which is operable to lock a vehicle's gear shift mechanism in a non-driving mode which will permit the vehicle's engine to be operated, but which will prevent shifting of the vehicle's transmission to a driving mode until such time as the driver's body and other front seat passengers' body restraining belts have been fastened.

Another object of the invention is to provide gear shift locking apparatus of the kind referred to which is compatible with the shifting mechanism and with the electronic interlock module with which such a vehicle is equipped.

A further object of the invention is to provide transmission locking apparatus which is capable of being accommodated within the confines of conventional steering column assemblies with which vehicles currently are equipped.

Objects and advantages of the invention will be pointed out specifically or will become apparent from the following description when it is considered in conjunction with the appended claims and the accompanying drawings wherein:

Figure 1:
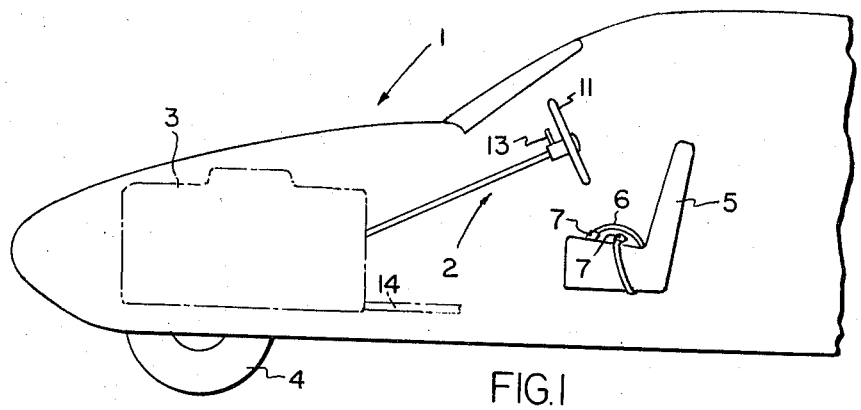
FIG. 1 is a diagrammatic, side elevational view illustrating a motor vehicle in which apparatus constructed according to the invention is installed.

Apparatus constructed according to the invention is adapted for use in a motor vehicle 1 having a steering column assembly 2, an engine 3, wheels 4, a front seat 5, and occupant restraining belts 6 provided with separable coupling elements 7. The steering column assembly includes a tubular housing 8 receiving a gear shifting tube 9 through which extends a steering shaft 10 that is coupled at its lower end to the vehicle's front wheels 4. A steering wheel 11 is fixed to the upper end of the steering shaft 10 for rotating the latter, as usual. A tubular shroud 12 surrounds the housing 8 as is conventional.

Figure 3:
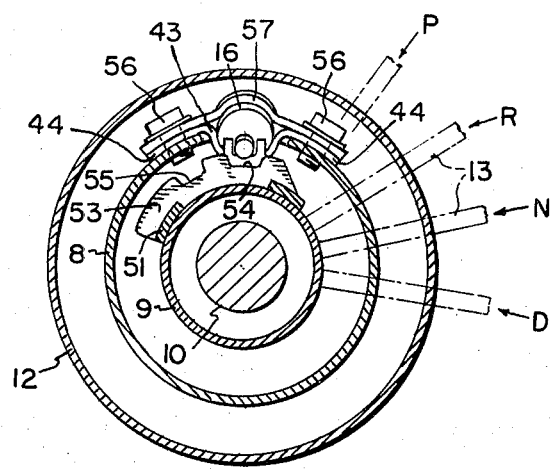
FIG. 3 is a sectional view taken along the line 3—3 of FIG. 2.

A gear selector lever 13 is connected to the shifting tube 9, as usual, and is shiftable between a neutral position N (FIG. 3), a park position P, a reverse position R, and a drive position D so that appropriate gears in the transmission may be engaged to couple the drive shaft 14 of the engine 3 to the vehicle's driving wheels 10.

Gear selector lever locking apparatus constructed according to the invention is designated generally by the reference character 15 and includes a substantially cylindrical housing 16 one end of which is partially closed by an end wall 21 having a central opening 22 therein. The other end of the housing is closed by a nonconductive terminal block 23 on which is mounted a pair of terminals 24 and 25.

A non-conductive bobbin 26 is accommodated in the housing 16 and concentrically mounts a driving solenoid winding 27 and a holding solenoid coil 28. The driving coil 27 has a relatively high current rating and a relatively low resistance, such as 2 ohms at 68° F., and is capable of developing a relatively high ampere-turn magnetic force, such as about 1.25 lbs. at 10 volts. The holding coil has a relatively low current rating and a relatively high resistance, such as 47 ohms at 68° F., so as to be capable of developing a substantially lower ampere-turn magnetic force.

The bobbin 26 seats against a metal washer 17 having a slot 18 at one side thereof. The bobbin has end flanges 29 and 30 and a central core 31 which extends beyond the flange 30. Fitted into the core is a preferably metallic, but nonmagnetic tube 32 within which is accommodated a stationary, magnetic tube or block member 33 having a reduced diameter extension 34 at one end which extends through the opening 22 in the housing wall 21. The extension 34 is peened over the wall 21 as at 35 so as to fix the member 33 relatively to the housing 16. The member 33 has a bore 36 through which extends a metallic locking pin 37 having a flat blade 38 at one end and being threaded at its other end for accommodation in a correspondingly threaded socket 39 formed in a reciprocable magnetic plunger 40 that is accommodated in the tube 32. That end 41 of the plunger which confronts the member 33 is of frustoconical configuration and is adapted to be received in a correspondingly configured recess 42 formed in the member 33.

Figure 2:
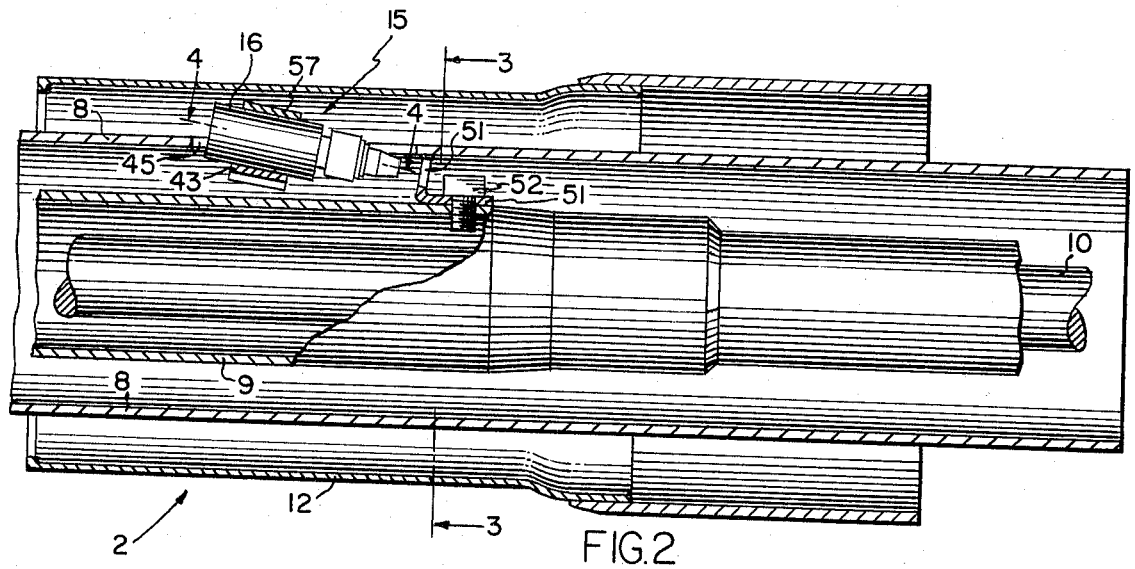
FIG. 2 is an enlarged sectional view illustrating apparatus constructed according to the invention mounted on the steering column of the motor vehicle illustrated in FIG. 1.
Figure 4:
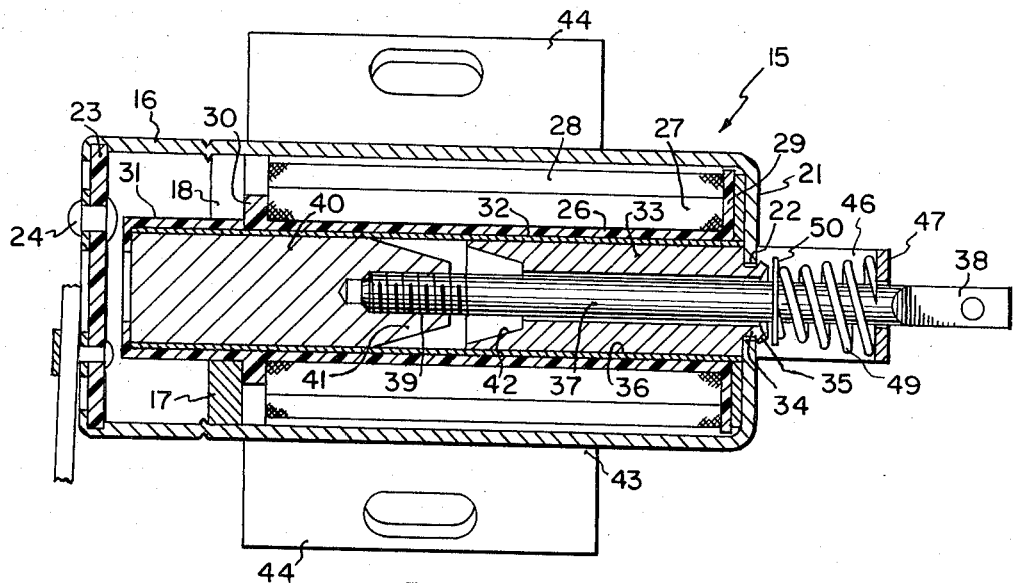
FIG. 4 is an enlarged sectional view of the gear shift lock apparatus and taken along the line 4—4 of FIG. 2.
Figure 5:
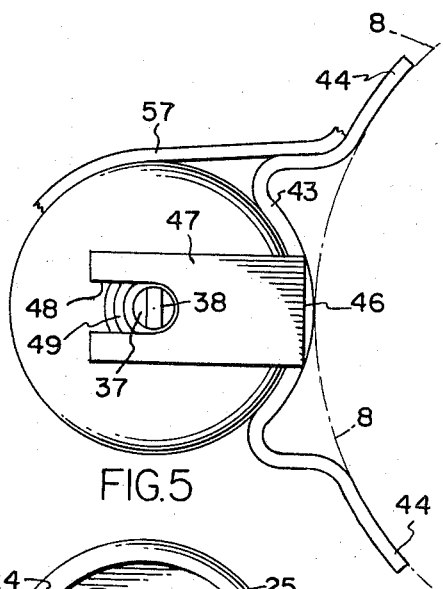
FIG. 5 is an elevational view of one end of the locking apparatus.
Figure 6:
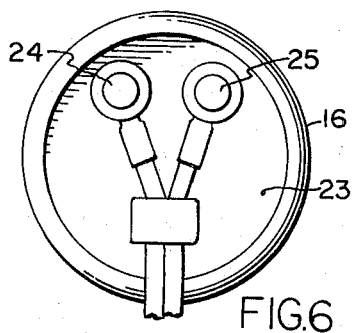
FIG. 6 is an elevational view of the opposite end of the apparatus.

The housing 16 is welded or otherwise suitably secured to a bracket 43 having a pair of legs 44 that are adapted to embrace the tubular member 8 on opposite sides of an opening 45 (FIG. 2). The bracket also includes an extension 46 having an arm 47 provided with an opening 48 through which the pin 37 extends. A coil spring 49 reacts between the arm 47 and a clip 50 fixed on the pin 37 so as to bias the latter and the plunger 40 to a normal, non-lock position as shown in FIG. 4.

The gear shifting tube 9 has a bracket 51 secured thereto by means of bolts 52. The bracket has an upturned flange 53 provided with a pair of notches 54 and 55 therein. The housing 16 and the bracket 43 are mounted on the tube 8 by means of bolts 56 and in such manner that the housing 16 extends through the opening 45 with the longitudinal axis of the locking pin 37 inclined to the axis of the tube 14 so as to enable the blade end 38 of the locking pin to be accommodated in either of the notches 54 and 55, as will be referred to in more detail hereinafter.

Figure 7:
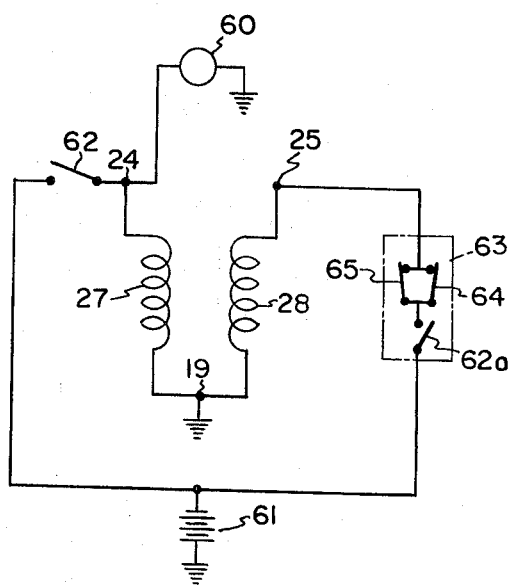
FIG. 7 is a schematic diagram of an electrical control circuit incorporating apparatus constructed according to the invention.

The circuitry of the solenoid windings and other parts of the vehicle's electrical system is illustrated in FIG. 7. A typical vehicle includes a starting motor 60 for the engine 3 connected to a battery 61 via an ignition switch having a normally open engine starting contact 62. One end of the solenoid driving coil 27 passes through the slot 18 of the washer and is connected to the terminal 24 between the contact 62 and the starting motor 60, and its other end is soldered as at 19 or otherwise connected to the metal washer 17 which is grounded. The solenoid holding coil 28 is connected in parallel with the coil 27 and has one end connected as at 19 to the washer 17. The other end of the coil 28 passes through the slot 18 and is connected to the terminal 25 which also is connected to the battery 61 via an interlock module or sensor 63 of known construction which is operable to sense the occupancy of a person in a seat of the vehicle. For illustrative purposes the sensor 63 is disclosed as being coupled to normally closed parallel switches 64 and 65 of which the switch 64 represents one or more switches embedded in the vehicle's seats and the switch 65 represents one or more switches that operate in response to the fastening of one or more of the vehicle's passenger restraining belts associated with the seats fitted with the switches 64. The sensor also may include a contact 62a which is controlled by the vehicle's ignition switch and which is opened and closed in response to corresponding movements of the ignition switch.

When it is desired to start the vehicle engine 3, the ignition switch must be in its on position, thereby closing the contact 62a, and the transmission gear selector lever 13, as is customary, must be located in a non-drive mode such as the neutral or park position. In either of these positions of the selector lever, movement of the ignition switch from its on position to its start position will close the starting switch contact 62 to energize the starter motor 60. Upon closing of the contact 62, the solenoid driving coil 27 will be energized to establish a sufficiently large magnetic field through the magnetic block 33 and the magnetic plunger 40 to attract the plunger to the block and thereby effect movement of the locking pin 37 to the locking position in which the blade 38 occupies either the notch 54 or the notch 55 (depending upon the position of the lever 13), thereby preventing movement of the lever 13 from the neutral or park position, respectively.

Unless the switch 64 is opened, such as by the weight of a person occupying a vehicle's seat, it will remain closed, and unless the switch 65 is opened by fastening of the restraining belt associated with the occupied seat, it also will remain closed. If either or both of the switches 64 and 65 are closed at the time the ignition switch is turned to its on position, thereby closing the contact 62a, the holding coil 28 will be energized at the same time.

Although the ampere turns of the holding coil 28 are insufficient to generate a magnetic field of such strength as to shift the locking pin 37 from its non-lock position to its lock position, the magnetic field generated by energization of the holding coil 28 is sufficient to maintain the locking pin in its lock position once the pin has been projected to such position by energization of the driving coil 27, irrespective and independent of the condition of the coil 27. That is, the magnetic force generated by the holding coil is sufficient to overcome the force of the spring 49 and hold the locking pin in its lock position even though the driving coil 27 may be deenergized. Thus, even though the contact 62 opens following return of the ignition switch from its start position to its on position, the locking pin 37 will remain in its lock position as long as either or both of the switches 64 and 65 are closed.

The switches 64 and 65 will remain closed until such time as the driver's seat is occupied and until such time as the restraining belts 6 are buckled together, whereupon both switches 64 and 65 will open, the holding coil 28 is deenergized, and the spring 49 restores the locking pin 37 to its unlock position. In the unlock position of the pin 37, the gear selector lever is free to be moved into a drive mode.

Although the switches 64 and 65 have been shown as being normally closed for simplicity of illustration of the function of the gear selector control apparatus, it should be understood that the circuitry and operating characteristics of different modules typified by the module 63 may vary so as to provide a circuit arrangement different from that described herein. It also should be understood that some modules are so constructed as to require predetermined sequencing of the seat and restraining belt switches in order to condition the vehicle for a driving mode. Apparatus according to the invention is capable of use with such other modules.

The disclosed embodiment is representative of a presently preferred form of the invention, but is intended to be illustrative rather than definitive thereof. The invention is defined in the claims.

I claim:

1. Apparatus adapted for use with a vehicle having transmission selector means shiftable between at least one drive mode and at least one non-drive mode, said apparatus comprising lock means movable between lock and unlock positions in which said selector means is respectively disabled from and enabled for movement from a non-drive mode to a drive mode; energizable and deenergizable magnetic drive means operable when energized to drive said lock means to said lock position; energizable and deenergizable magnetic holding means operable in response to energization of said drive means to hold said lock means in said lock position; means for energizing and deenergizing said drive means; and means for energizing and de-energizing said holding means, said means for deenergizing said holding means being independent of the means for deenergizing said drive means.

2. Apparatus according to claim 1 including return means acting on said lock means and biasing the latter to said unlock position, said holding means when energized being operable to overcome said return means.

3. Apparatus according to claim 1 wherein said drive means comprises a solenoid having a magnetic armature and a first winding encircling said armature.

4. Apparatus according to claim 3 wherein said holding means comprises a second winding encircling said armature.

5. Apparatus according to claim 4 wherein said first winding has a greater number of ampere turns than said second winding.

6. Apparatus according to claim 3 wherein said windings are connected in parallel with one another.

7. Apparatus according to claim 3 wherein said lock means is carried by said armature for movements therewith.

8. Apparatus according to claim 7 wherein said lock means extends through a magnetic member located in the path of movement in one direction of said armature.

9. Apparatus according to claim 8 wherein said armature and said magnetic member have confronting ends shaped to nest with each other.

10. In a vehicle having engageable and disengageable occupant restraint means associated with at least one seat of said vehicle, gear selector means movable between drive and non-drive modes, shift means for moving said selector means between said modes, an energizable ignition system, and means for sensing whether said restraint means is engaged or disengaged, the combination of lock means movable between lock and unlock positions for respectively disabling and enabling movement of said selector means from its non-drive mode to its drive mode; drive means coupled to said ignition system for driving said lock means to its lock position in response to energization of said system; energizable and deenergizable holding means coupled to said drive means and to said sensing means and operable in response to energization of said drive means for holding said lock means in said lock position unless said restraint means is engaged; and means operable in response to engagement of said restraint means for deenergizing said holding means.

11. The combination according to claim 10 wherein said sensing means includes means for detecting the occupancy of a seat of said vehicle, and means coupling said detecting means to said holding means for preventing deenergization of the latter unless said restraint means is engaged.

* * * * *

UNITED STATES PATENT OFFICE
CERTIFICATE OF CORRECTION

Patent No. 3,870,120     Dated April 25, 1975

Inventor(s) Paul J. Blinkilde

It is certified that error appears in the above-identified patent and that said Letters Patent are hereby corrected as shown below:

Please change the name of Assignee from "Epsex" to --Essex--.

Signed and sealed this 24th day of June 1975.

(SEAL)
Attest:

RUTH C. MASON
Attesting Officer

C. MARSHALL DANN
Commissioner of Patents
and Trademarks